(No Model.) 4 Sheets—Sheet 1.
E. C. SCHROEDER.
POTATO PLANTER.
No. 541,458. Patented June 25, 1895.
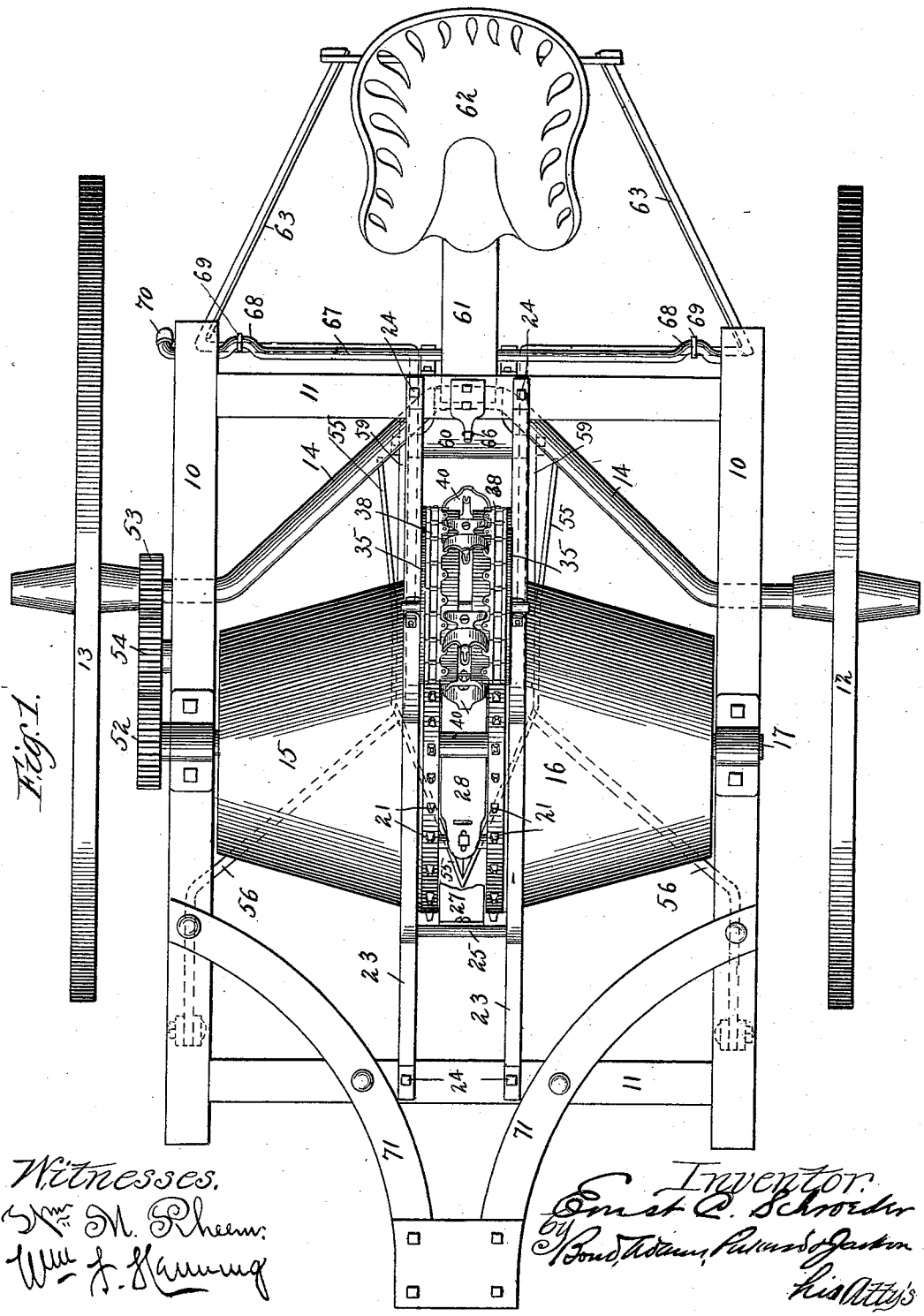

(No Model.) 4 Sheets—Sheet 2.
E. C. SCHROEDER.
POTATO PLANTER.
No. 541,458. Patented June 25, 1895.
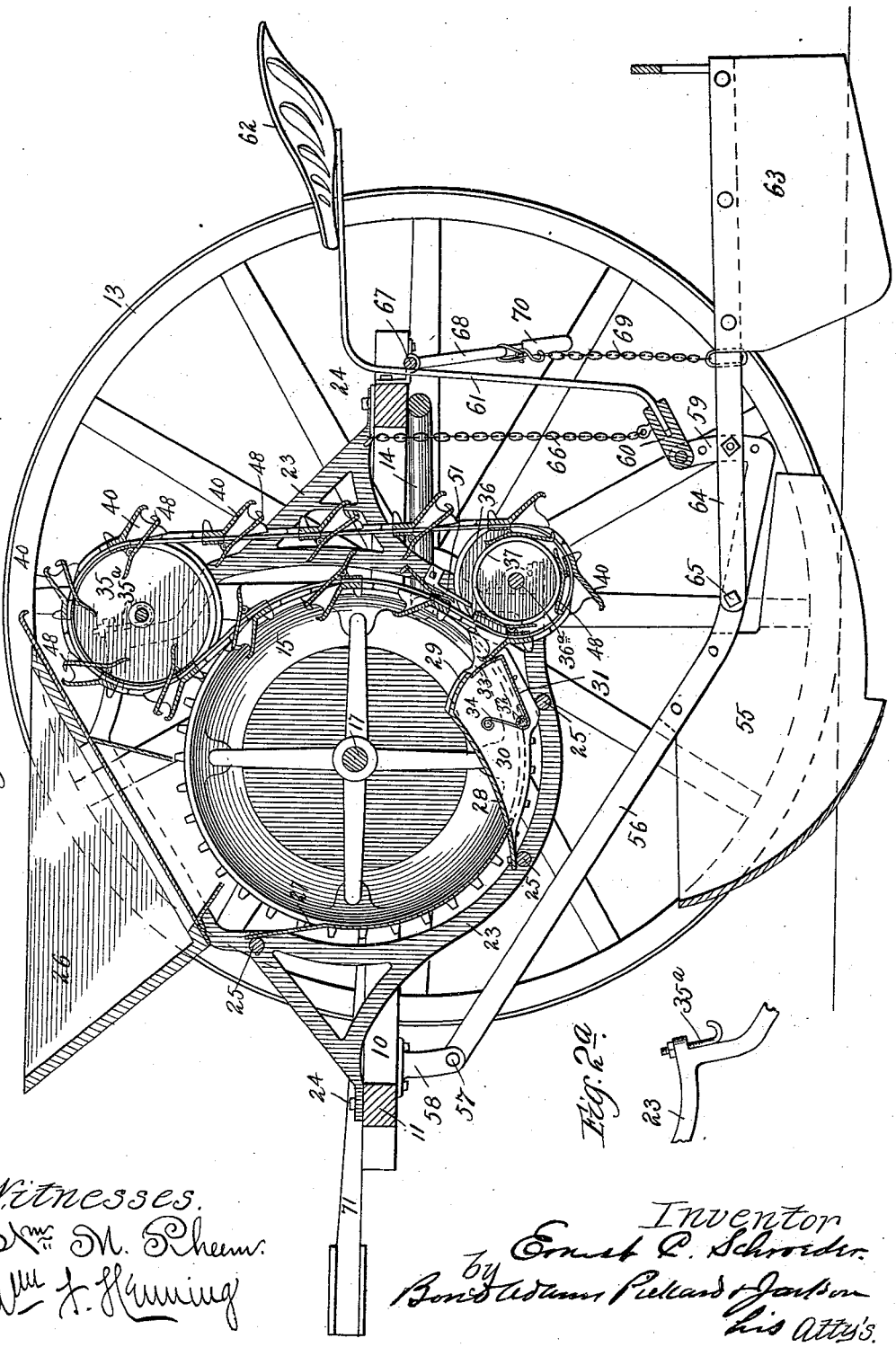
Witnesses.
Inventor
Ernest C. Schroeder
by Bond Adams Pickard & Jackson
his Atty's (No Model.) 4 Sheets—Sheet 3.
E. C. SCHROEDER.
POTATO PLANTER.
No. 541,458. Patented June 25, 1895.
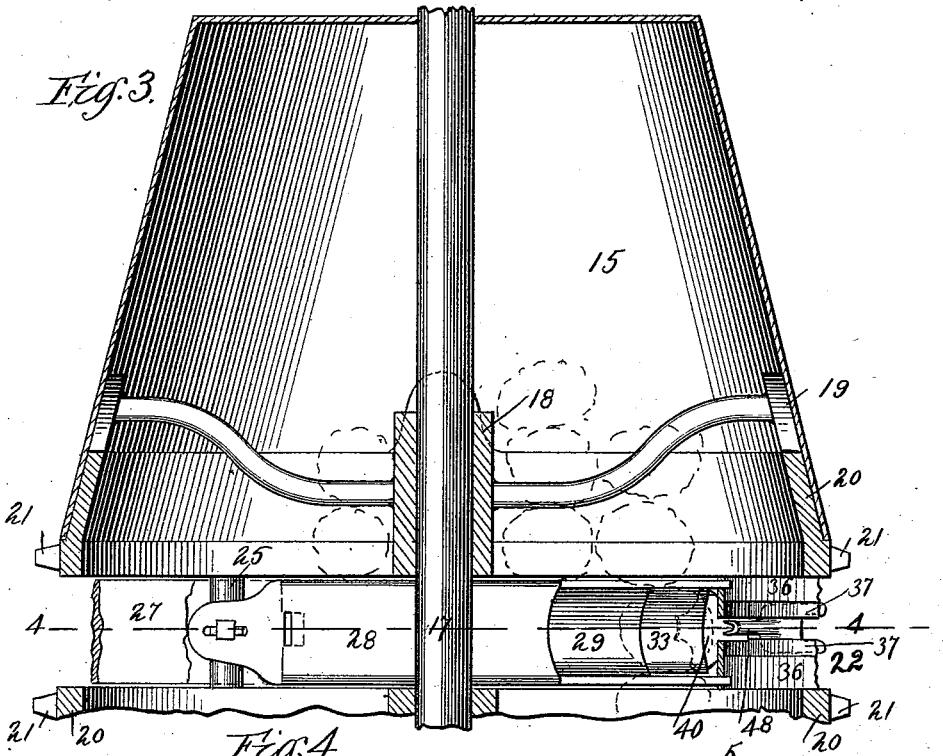
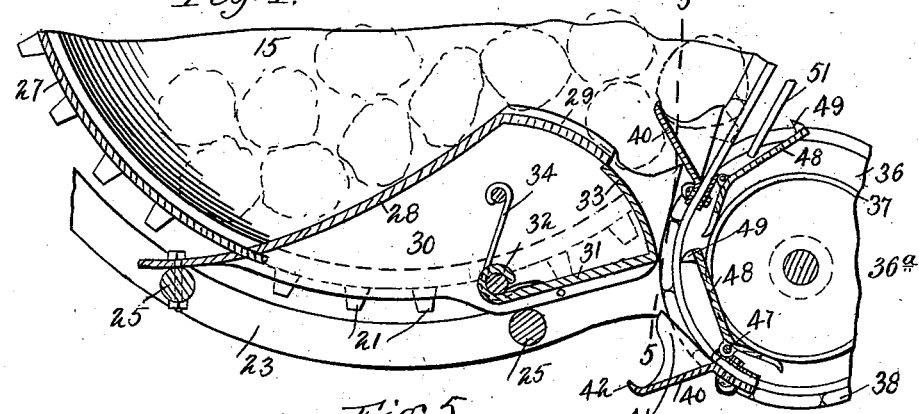
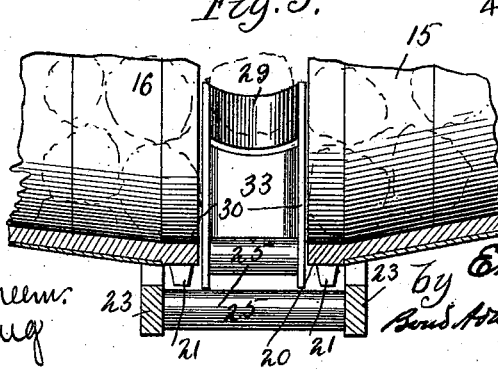

(No Model.) 4 Sheets—Sheet 4.
E. C. SCHROEDER.
POTATO PLANTER.
No. 541,458. Patented June 25, 1895.
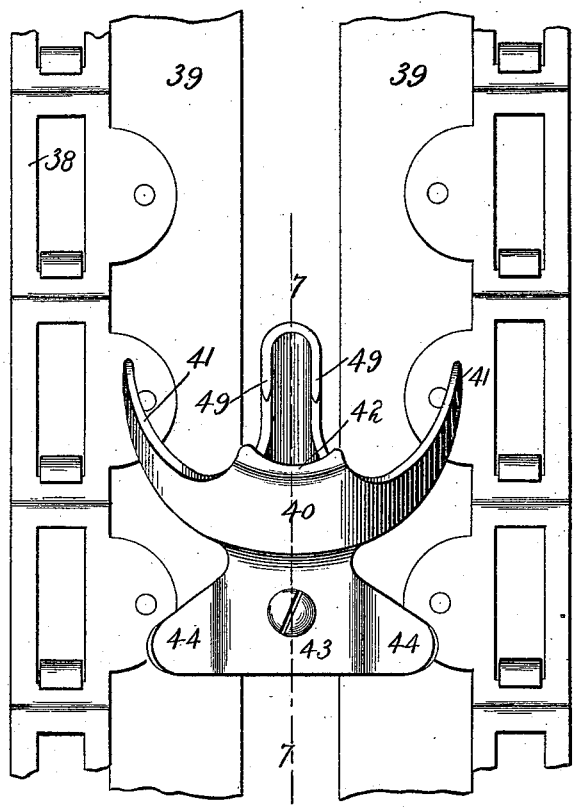
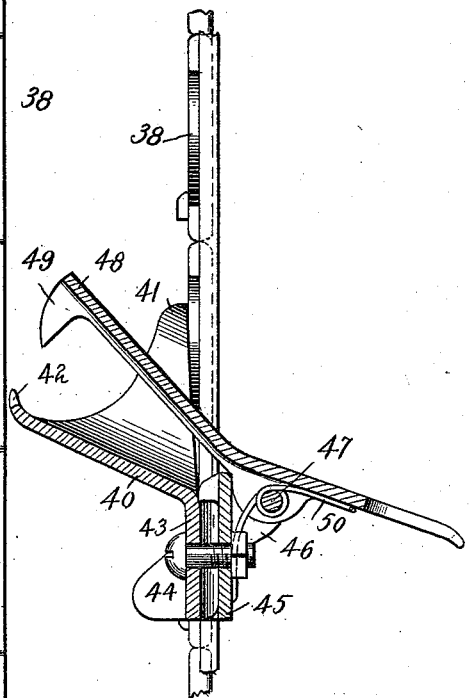
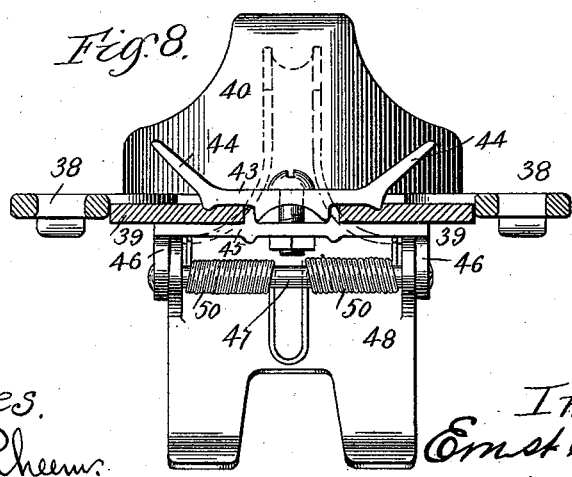
Witnesses.
Inventor
Ernst C. Schroeder
by Bond Adams Pickard & Jackson
his Atty's

UNITED STATES PATENT OFFICE.

ERNST C. SCHROEDER, OF ITASCA, ILLINOIS.

POTATO-PLANTER.

SPECIFICATION forming part of Letters Patent No. 541,458, dated June 25, 1895.

Application filed November 26, 1894. Serial No. 529,992. (No model.)

*To all whom it may concern:*

Be it known that I, ERNST C. SCHROEDER, a citizen of the United States, residing at Itasca, county of Du Page, and State of Illinois, have invented certain new and useful Improvements in Potato-Planters, of which the following is a specification, reference being had to the accompanying drawings, in which—

Figure 1 is a top or plan view with the hopper through which the potatoes are fed to the machine removed. Fig. 2 is a longitudinal vertical central section. Fig. 2ª is a detail of the devices for supporting the upper pulleys. Fig. 3 is a detail in section of one of the halves of the potato-receptacle and of a portion of the devices between the two halves of the receptacle. Fig. 4 is a section on line 4 4 of Fig. 3. Fig. 5 is a section at line 5 5 of Fig. 4, looking to the left. Fig. 6 is a top or plan view of a potato-holder and the belt to which it is attached. Fig. 7 is a section at line 7 7 of Fig. 6, and Fig. 8 is a rear view of the parts shown in Fig. 6.

This invention relates to improvements in potato planters, and more especially to improvements on the machine shown and described in Letters Patent No. 368,495, granted to me August 16, 1887. In the machine shown in said patent the receptacle for holding the potatoes to be planted is formed in two parts or halves mounted on a common shaft and driven by suitable gearing from one of the supporting wheels of the machine, and between the two halves of such potato receptacle is interposed a movable, flexible belt carrying potato-gripping jaws, each of which seizes a potato from the receptacle and carries it to the proper point for dropping when the jaws are opened for that purpose.

My present invention embodies the same idea of the two-part potato-receptacle with a carrying belt moving between the two parts of the receptacle and provided with suitable devices for seizing and retaining a potato and carrying it to the proper point to be discharged.

The object of my present invention is to make a machine having all the capabilities of said patented machine, but with considerably less mechanism; which I accomplish by dispensing with two of the pulleys on which the flexible belt runs, and by providing a cheap and simple means for closing a portion of the space between the two halves of the potato receptacle that was formerly occupied by the moving belt. I have also improved said machine by providing a device that will insure the potatoes being fed regularly and without undue crowding to the potato holders or grippers on the carrying belt; and I have also provided an improved potato holding or gripping device for taking the potatoes from the main receptacle to the point of discharge.

A number of other improvements in the details of construction have been made, all as shown in the drawings and as fully and specifically described hereinafter.

That which I regard as new will be set forth in the claims.

In the drawings, 10 indicates the side bars of the main frame, and 11 the end bars.

12—13 indicate the carrying wheels, mounted on an axle 14, which, as shown in Fig. 1, is rearwardly curved.

15—16 indicate the two halves of the potato receptacle, which are keyed on a common shaft 17 suitably journaled in the side bars 10 of the frame. Each half of the receptacle is secured to the shaft by a spider 18, which is keyed on said shaft. The arms of this spinder have secured at their outer ends, or formed with said arms, a ring 19 fitting snugly against the wall of the potato receptacle. This construction allows the halves of the receptacle to made of sheet metal, if desired. 20 indicates a ring inserted in the open end of each half of the potato receptacle, as shown in Fig. 3, and 21 indicates cogs formed on such ring for driving the flexible belt hereinafter described. As shown, there is a space 22 of several inches left between the two large open ends of the two halves 15—16 of the potato receptacle.

23 indicates metal frames, each securely bolted in place to the front and rear cross bars of the machine, as shown at 24. One of these metal frames 23 surrounds but does not touch one of the halves of the potato receptacle near its larger and open end, and the other of the frames 23 occupies a similar position with reference to the other half of the potato receptacle, as clearly shown in Figs. 1 and 2. These two metal frames 23 are joined together at intervals by cross rods 25.

26 indicates a hopper of any suitable construction, placed on top of the frames 23 and communicating with the interior of the potato receptacle through the space 22 between the two parts of the receptacle.

27 indicates a plate of sheet metal, or other suitable material, secured at its upper end to one of the cross rods 25 and extending down and closing the space 22 for a considerable distance so as to prevent the escape of potatoes from the potato receptacle 15—16. Near the point where such plate 27 ends another plate 28 is bolted to another one of the cross rods 25, this plate 28 extending upward for the greater portion of its length, and then being bent downward as indicated at 29. This plate 28—29 is provided with side pieces 30, so that such plate with its side pieces forms an effectual bar to the escape of potatoes for the portion of the space 22 that it guards.

31 indicates a plate pivoted at 32 to the side pieces 30 which has an upwardly extending and curved portion 33 the upper end of which, when the parts are in the position shown, rests against the inner face of the downwardly projecting portion 29 of the plate 28.

34 indicates a spring for returning the plate 31 to its normal position and holding it in such position.

35 indicates two pulleys mounted on the same shaft and separated by the width of the space 22 so that such pulleys are opposite the teeth 21 on the two halves 15—16 of the potato receptacle. The shaft on which these two pulleys 35 are mounted is supported by two bolts 35ª, one depending from the upper portion of each frame 23, and as shown the lower ends of these bolts are curved to conform to the shape and size of the shaft, and afford suitable bearings therefor. Each bolt 35ª is held in place by a nut on its upper end, by means of which the pulleys 35 can be properly adjusted to secure the requisite tension on the belts. At the lower portion of said frames 23 is journaled another shaft 36ª, on which is keyed two other pulleys 36, such last named pulleys being below and in line with the upper pulleys 35.

37 indicates an annular flange projecting from the inner face of one of the pulleys 36, with which one end of the potato grasping jaw comes in contact for the purpose of forcing back such jaw in order to allow of the potato in the potato-holder being released and falling to the ground. It is evident that instead of this piece 37 being an annular flange it might be a small plane surface roller or pulley keyed on the same shaft.

38 indicates two ordinary link belts arranged parallel with each other and adapted to run over the pulleys 35—36. To the inner side of each link belt is a leather or other flexible belt 39 suitably attached one to each link belt. To the outer faces of the flexible belts 39 is secured a series of potato holders 40, the sides 41 of each of such holders being turned up the better to retain the potato that is to be deposited therein. The front edge 42 of each holder is also turned up, as shown. Formed with each holder is a downward extension 43, the sides 44 of which are flared out for the purpose hereinafter mentioned. On the opposite faces of the belts 39 and opposite the lower end of each potato holder are secured plates 45 having upturned ears 46 between which is secured a short rod 47 on which is pivoted a spring-actuated jaw 48 which projects between the belts 39 and over the potato holder 40. Each jaw is provided on its upper end with one or more teeth 49, two of such teeth being shown on each jaw. The spring which actuates the jaw is indicated by 50.

Each potato holder 40 and its plate 45 are clamped on to the belts 39, as shown, by a nut and bolt, the faces of the extension 43 of the potato holder and the plate 45 being provided with points which sink into the comparatively soft material of which the belts 39 are composed, thus holding them firmly in position. It is obvious, of course, that the two parts might be securely held together in any suitable manner.

51 indicates a short plate secured between the two metal frames 23 immediately above the pulleys 36 and acting upon the spring jaw 48 of the potato gripping device in the same manner that the annular flange 37 on the pulley 36 does.

52 indicates a gear wheel on the shaft 17, 53 a gear wheel on the axle 14, and 54 a gear wheel intermediate of the gears 52 and 53.

55 indicates a plow for opening the furrow to receive the potatoes which is held braced in position by two bars 56 to which it is bolted, which bars are pivoted at 57 to downwardly extending hangers 58 bolted to the under sides of the side bars 10. The rear ends 59 of these bars are turned up and bolted to a piece 60 to which the seat bar 61 is secured.

62 indicates the seat.

63 indicates wings for covering the potatoes after being deposited in the furrow. Each covering wing is bolted to a bar 64 which is pivoted at 65 to one of the bars 56. As shown in Fig. 2, each covering wing is capable of being adjusted as desired by moving it up or down on the upturned end 59 and securing it by a bolt passing through one of the holes in such upturned end.

66 indicates a chain secured to the rear end of each of the frames 23 at its upper end, and at its lower end to the piece 60, and acts to limit the penetration of the plow 55.

67 indicates a rod extending across the rear end of the machine and provided with crank arms 68 near each end, to which crank arms are attached chains 69 through which the plow and covering wings may be raised and lowered.

70 indicates a handle attached to or formed with one end of the rod 67 for operating it.

71 indicates braces at the forward end of the machine bolted to the side bars 10 and the forward end bar 11, and projecting forward to form a means of attachment for the tongue.

The operation is as follows: Potatoes for planting having been fed into the receptacle 15—16 through the hopper 26, the machine is drawn forward, the plow 55 forming a furrow into which it is designed to drop the potatoes. The movement of the machine causes the receptacle 15—16, through the gear wheels 52—53—54, to rotate, which rotation through the cogs 21 on the two halves of the receptacle, drives the link belts 38 over and around the two pulleys 35—36, carrying with them, of course, the potato receiving and retaining devices attached thereto. It will be noted that the space 22 between the two halves of the potato receptacle is closed sufficiently by the plates 27—28 and the belts 38—39 to prevent the escape of any potatoes except by means of the potato receiving and retaining devices, which are adapted to each carry but one potato at a time. As the belts 38—39 are carried around the pulleys 35—36 each potato holder will in succession strike against the lower side of the spring-actuated plate 31, forcing it upward until the potato holder has passed out of contact, when it will return to the position indicated in the drawings. The potato holder as it leaves the spring-actuated plate 31 will have deposited therein a potato which has been resting against the upturned edge 33 of such plate 31, and will carry it upward, the spring jaw 48 being held back, as shown in Fig. 2, during this operation, by the flange 37 and the short plate 51. Immediately upon passing the plate 51, however, the spring jaw will, by the action of the spring 50, be forced forward, and the potato in the holder will be grasped and held tightly between the edge 42 of the holder and the projecting teeth 49 on the end of the jaw. It will be held in this manner while being carried out of the receptacle, around the pulley 35, and down until the pulley 36 is reached, where it will be released and dropped to the ground by reason of the spring jaw 48 coming in contact with the flange 37 on such pulley 36. This action will be repeated, of course, with each successive potato holder.

By providing the inclined plate 28 the bulk of the potatoes in the receptacle is kept away from the belts that run over the two pulleys, thus causing less strain to be put upon those parts, but at the same time the constant rotation of the potato receptacle is sufficient to cause some potatoes at all times to be carried over this inclined plate 28 and rest against the downward forward extension 33 of the spring-actuated plate 31, so that the potato holders need never make the circuit without carrying each a potato.

It has been found in practice that by flaring outward the sides of the downward extension 43 of the potato holder, as shown at 44, such outward flaring ends 44 act upon the potatoes in the receptacle in such manner as to settle a potato in the right position to be readily caught in the succeeding potato holder 40.

By the construction shown I provide a potato planter that is comparatively simple in construction, readily operated, and that grasps, retains and discharges into the furrow potatoes with great regularity.

That which I claim as my invention, and desire to secure by Letters Patent, is—

1. The combination with a rotating potato receptacle, and means for rotating the same, of a traveling belt carrying potato holders, and means for reducing the quantity of potatoes to be thrown at one time against the belt and the holders carried thereby, substantially as specified.

2. The combination with a rotating potato receptacle, and means for rotating the same, of a traveling belt carrying potato holders, and an inclined plate for reducing the quantity of potatoes to be thrown at one time against the belt and the holders carried thereby, substantially as specified.

3. The combination of a rotating potato receptacle, means for rotating the same, a traveling belt carrying potato holders, means for reducing the quantity of potatoes to be thrown at one time against the belt and the holders carried thereby, and a movable plate adapted to be moved as each potato holder is being brought into action, substantially as specified.

4. The combination of a rotating potato receptacle, means for rotating the same, a traveling belt carrying potato holders, means for reducing the quantity of potatoes to be thrown at one time against the belt, and a pivoted plate adapted to be moved upward by contact of each potato holder therewith, substantially as and for the purpose specified.

5. The combination of a rotating potato receptacle, means for rotating the same, a traveling belt carrying potato holders, an inclined plate for reducing the quantity of potatoes to be thrown at one time against the belt and the holders carried thereby, and side walls 30 attached to said inclined plate, substantially as and for the purpose specified.

6. The combination of a two-part potato receptacle, means for rotating the same, plates for closing a portion of the space between the two parts of the receptacle, and a belt carrying potato holders, said belt and the holders thereon closing another portion of such space against the escape of potatoes, substantially as specified.

7. The combination of a two-part potato receptacle, means for rotating the same, plates for closing a portion of the space between the two parts of the receptacle, one of said plates being inclined to prevent an undue number of potatoes being thrown toward that side from which the potatoes are removed, and a belt carrying potato holders, said belt and the holders thereon closing another portion of said space against the escape of potatoes, substantially as specified.

8. A potato receptacle, and means for rotating the same, in combination with a belt carrying potato holders, means for driving said belt, pulleys over which said belt runs, and a flange on one of said pulleys for causing potatoes in the holders to be released and dropped, substantially as specified.

9. In a potato planter, the combination with a potato receptacle 15—16, and means for rotating the same, of a spider 18 in each part of said receptacle, a ring at the open end of each part 15—16, cogs 21 on said rings, belts engaging with and driven by said cogs, potato holders carried by said belts, and devices for releasing and dropping the potatoes from said holders, substantially as specified.

10. The combination of the link belts 38, flexible belts 39 secured to said link belts, and potato holders attached to said flexible belts, substantially as and for the purpose specified.

11. A holder for potatoes adapted to be secured to a traveling belt, and having a downward extension provided with flaring sides, substantially as and for the purpose specified.

12. The combination of a potato holder, a belt to one face of which said holder is secured, and a pivoted jaw attached to the opposite side of said belt and normally held across said belt and over the potato holder, substantially as specified.

13. The combination of a potato holder 40 having a downward extension 43 provided with flaring sides 44, the plate 45, jaw 48 pivoted to the plate 45, and provided with an end 49 for engaging a potato and holding it against the holder 40, substantially as and for the purpose specified.

ERNST C. SCHROEDER.

Witnesses:
CHARLES SANDHAGEN,
LOUIS SCHROEDER.